United States Patent [19]

Wolfe

[11] 4,022,070

[45] May 10, 1977

[54] ENDLESS POWER TRANSMISSION BELT

[75] Inventor: Jerry D. Wolfe, Springfield, Mo.

[73] Assignee: Dayco Corporation, Dayton, Ohio

[22] Filed: Apr. 22, 1976

[21] Appl. No.: 679,265

[52] U.S. Cl. .............................. 74/231 P; 74/233; 156/139

[51] Int. Cl.² ...................... F16G 1/00; F16G 5/16

[58] Field of Search ............. 74/231 P, 231 R, 232, 74/233; 156/139, 140, 142

[56] References Cited

UNITED STATES PATENTS

| | | | |
|---|---|---|---|
| 2,067,400 | 1/1937 | Koplin et al. | 74/233 |
| 2,281,148 | 4/1942 | Freedlander | 74/233 |
| 2,446,310 | 8/1948 | Steinke | 74/233 |
| 2,631,463 | 3/1953 | Waugh | 74/233 |

Primary Examiner—Edgar W. Geoghegan
Attorney, Agent, or Firm—Reuben Wolk

[57] ABSTRACT

An endless power transmission belt body and a banded belt employing a plurality of such bodies are provided wherein each belt body comprises a tension section, a compression section, a continuous longitudinally extending load-carrying cord disposed between the sections and defined by a plurality of helically wound turns, and a platform on at least one side of the load-carrying cord with the platform having a fabric base layer and an elastomeric cord-engaging layer. The fabric base layer supports the plurality of turns in precise rectilinear alignment at any cross section along the belt body providing substantially equal load distribution in the turns promoting longer belt life and enabling winding of the cord at a comparatively large helix angle.

23 Claims, 7 Drawing Figures

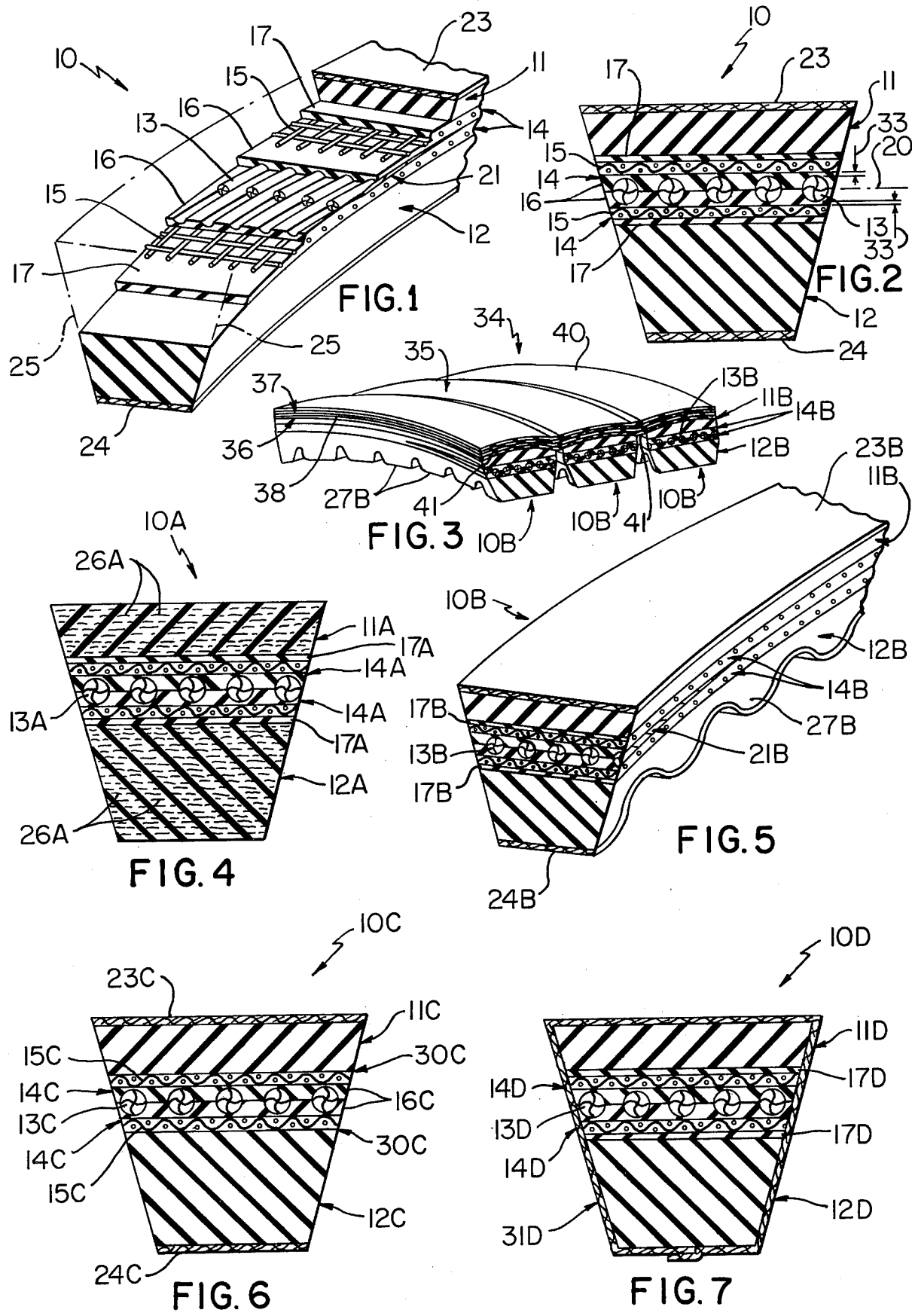

ENDLESS POWER TRANSMISSION BELT

BACKGROUND OF THE INVENTION

There are numerous belts in wide use throughout industry which have one or more helically wound load-carrying cords defining the load-carrying section thereof; however, in fabricating each of these belts the cord is usually wound on a comparatively soft layer of cushion material whereby individual turns of the overall load-carrying cord generally are embedded within such cushion in varying amounts depending upon the resistance offered by the cushion and the tension applied on the load-carrying cord during winding with the net result being that the turns are generally not in precise rectilinear alignment at any cross section along the belt resulting in unequal load distribution in the turns which tends to cause a corresponding reduction in belt life. In addition, in previously proposed belts the load-carrying cord is usually wound on a comparatively small helix angle resulting in a substantial amount of cord being required for a particular belt and also resulting in substantial amounts or lengths of exposed cord at the sides of a belt such as a so-called raw-edged belt.

In a belt which has a substantial length of exposed cord at the sides thereof there is considerable scrap in cutting such a belt from an associated belt sleeve caused by popping or extruding of cord during the cutting process and such popping and extruding often occurs in this type of a belt during certain types of normalizing or curing processes.

SUMMARY

It is a feature of this invention to provide an endless power transmission belt body capable of operating over an extended service life even under high loads.

Another feature of this invention is to provide an endless power transmission belt body which may be made with minimum scrap.

Another feature of this invention is to provide an endless power transmission belt structure or body and a banded belt employing a plurality of such bodies wherein each belt body has a tension section, a compression section, a continuous longitudinally extending load-carrying cord disposed between the sections and defined by a plurality of helically wound turns, and a platform on at least one side of the load-carrying cord with the platform having a fabric base layer and an elastomeric cord-engaging layer. The fabric base layer supports the plurality of turns in precise rectilinear alignment at any cross section along the belt body thereby providing substantially equal load distribution in the turns promoting longer belt life and enabling winding of the cord at a comparatively large helix angle to reduce the length of the cord required in the belt.

Accordingly, it is an object of this invention to provide an endless power transmission belt body, a banded belt employing same, and a method of making such a belt body and banded belt having one or more of the novel features set forth above or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which FIG. 1 is a perspective view with parts in cross-section, parts in elevation, and parts broken away illustrating one exemplary embodiment of an endless power transmission belt body of this invention and with certain component layers in the central portion of the belt body drawn with an exaggerated thickness for ease of illustration;

FIG. 2 is a cross-sectional view of the belt body of FIG. 1 with component portions thereof drawn more nearly to their relative sizes;

FIG. 3 is a fragmentary perspective view of a banded belt of this invention employing a plurality of belt bodies of FIGS. 1–2;

FIG. 4 is a cross-sectional view similar to FIG. 2 illustrating another exemplary embodiment of the belt body of this invention;

FIG. 5 is a perspective view with parts in cross section, parts in elevation, and parts broken away illustrating another exemplary embodiment of an endless power transmission belt body of this invention;

FIG. 6 is a cross-sectional view similar to FIG. 2 illustrating another exemplary embodiment of the belt body of this invention; and FIG. 7 is a view similar to FIG. 2 illustrating another exemplary embodiment of a belt body of this invention which has a cover about its entire periphery.

DESCRIPTION OF ILLUSTRATED EMBODIMENTS

Reference is now made to FIG. 1 of the drawing which illustrates one exemplary embodiment of an endless power transmission belt structure or body of this invention which is designated generally by the reference numeral 10 and such belt body 10 will hereinafter also be referred to as simply belt 10 and is particularly adapted to be operated around associated sheaves and in an endless path and in a manner well known in the art. The belt 10 comprises a tension section 11, a compression section 12, and a continuous longitudinally extending load-carrying cord 13 disposed between sections 11 and 12 and the cord 13 is defined by a plurality of helically wound turns shown as 5 turns in this example.

The belt 10 has a plurality of two multiple ply platform layers or platforms one on each side of load-carrying cord 13 and each platform is designated generally by the reference numeral 14. Each platform 14 is defined by a fabric base layer 15 and an elastomeric cord-engaging layer 16 whereby a portion of the cord 13 is partially embedded in each layer 16. Each platform 14 is provided with an elastomeric layer 17 disposed on the surface of the fabric layer 15 which is arranged remote from the load-carrying cord 13.

The belt 10 is unique in that each platform 14 and in particular each fabric base layer portion 15 of each platform 14 due to its comparative rigidity and close proximity (which will be defined in detail later) to the load-carrying cord 13 supports the plurality of turns of the endless helically wound load-carrying cord 13 in precise rectilinear alignment at any cross section along the belt 10; and, to highlight this concept a dot-dash line 20 is shown (FIG. 2) through the centers of the turns of the load-carrying cord 13. The precise rectilinear alignment of the turns at any cross section along the belt provides substantially equal load distribution in the turns so that the load carried by one of the turns is substantially equal to the load carried by an immediately adjacent turn or a remote turn whereby this results in promoting longer belt life.

The support provided by each base layer portion 15 of each platform 14 also enables winding of the cord 13 at a comparatively large helix angle which serves to reduce the length of cord required and also serves to reduce the amount of cord 13 which is exposed from its matrix at the sides of the belt 10. As will be readily apparent from the raw-edged belt of FIG. 1 only a small wedge of a cord 13 is exposed at one side of the belt 10 as shown at 21. This minimum side exposure of cord 13 in a raw-edged belt helps isolate such cord which also helps prevent it from being damaged or attacked by corrosive fluids.

The belt 10 has a cover shown as a fabric cover 23 on the top surface of the tension section 11 which defines the outside surface of the belt 10; and, such belt has a cover shown as a fabric cover 24 on the bottom surface of the compression section which defines the inside surface of the belt 10. The covers 23 and 24 may be made of any suitable material including woven, non-woven, and knitted materials or fabrics.

As will be readily apparent from FIGS. 1 and 2, the belt 10 has a substantially trapezoidal cross-sectional configuration with its parallel sides being defined by the parallel outside cover 23 and inside cover 24. The straight dot-dash line 20 indicates the precise rectilinear alignment of the turns of the load-carrying cord 13 and that such cord is disposed parallel to and between the top and bottom surfaces of the belt as defined by the outermost surfaces of the covers 23 and 24 respectively and in this example such surfaces are planar surfaces. It will also be seen that the exemplary trapezoidal belt 10 has opposed non-parallel sides 25 free of covers as indicated earlier and such belt is referred to in the art as having raw-edged sides.

The amount of cord 13 exposed at each side 25 of the belt 10 is kept at a minimum; and, this helps assure that the side turns of the load-carrying cord 13 of belt 10 have optimum strength. It has also been found that by reducing the amount of the cord 13 exposed at the sides of the belt and holding individual turns of the cord in precise rectilinear alignment at any cross section along the belt, a plurality of belts 10 may be cut from an associated sleeve in the usual manner (known in the art) with minimum scrap; and, there is less tendency for side turns to pop out during certain types of curing and/or normalizing operations which also minimizes scrap.

Other exemplary embodiments of the belt structure or belt body of this invention are illustrated in FIGS. 4, 5, 6, and 7 of the drawing. The belts illustrated in FIGS. 4, 5, 6, and 7 are very similar to the belt body or belt 10; therefore, such belt bodies which will also be referred to as belts will be designated generally by the reference numerals 10A, 10B, 10C, and 10D respectively and parts of such belts 10A, 10B, 10C, and 10D which are similar to corresponding parts of the belt 10 will be designated by the same reference numeral as in the belt 10 also followed by the associated letter designation, A, B, C, or D and not described again in detail. Only those component parts of each of the belts 10A, 10B, 10C, and 10D which are different from corresponding parts of the belt 10 will be designated by a new reference numeral also followed by its associated letter designation and described in detail.

The belt 10A of FIG. 4 has a tension section 11A, a compression section 12A, and helically wound load-carrying cord 13A and the belt 10A has a platform 14A on each side of the load-carrying cord 13A. The belt 10A has raw-edged outside and inside surfaces free of covers and the sides of such belt are also free of covers. However, it will be seen that the belt 10A has a plurality of discrete elongated fiber particles or fibers 26A embedded in the elastomeric matrix of its tension and compression sections 11A and 12A respectively. The fibers 26A are disposed substantially transverse the endless path or longitudinal axis of the belt 10A and the fibers 26A are preferably disposed substantially perpendicular to the longitudinal axis of such belt.

The belt 10B of FIG. 5 has a tension section 11B, a compression section 12B, and helically wound load-carrying cord 13B as well as platforms 14B on each side of load-carrying cord 13B. It will also be seen that the belt 10B has an outside cover 23B and an inside cover 24B; however, the main difference between the belt 10B and belt 10 is that the belt 10B has a plurality of integral teeth 27B defined in its compression section 12B and the teeth extend substantially transverse (perpendicular in this example) to the longitudinal axis of the belt 10B. It will also be appreciated that the belt 10B may have elongated discrete particles or fibers embedded in its tension section 11B, compression section 12B, or both of of such sections 11B–12B, if desired.

The belt 10C of FIG. 6 is substantially identical to the belt 10 of FIG. 2 and has a tension section 11C, a compression section 12C, a helically wound load-carrying cord 13C, and platforms 14C on opposite sides of the helically wound load-carrying cord. Each platform 14C has a layer 16C which engages the load-carrying cord and a fabric base layer 15C; however, it will be seen at each platform 14C is minus an elastomeric layer adjoining the surface of its fabric layer 15C disposed remote from the load-carrying cord and as will be readily apparent at 30C. It will be appreciated that a very small thickness, practically a film, of elastomeric material comprising each layer 16C will in essence flow through the warps and wefts of the fabric layer 15C and define a comparatively thin coating on the remote surface of each fabric layer 15C remote from the load-carrying cord 13C. This thin coating enables adhesion of layer 15C with its adjoining section. As in the case of the belt 10, the belt 10C has a cover 23C defining its outside surface and a cover 24C defining its inside surface.

The belt 10D of FIG. 7 has a tension section 11D, compression section 12D, helically wound load-carrying cord 13D, and platform layers 14D whereby the internal portions of belt 10D are substantially identical to corresponding portions of the belt 10 of FIG. 2. However, it will be seen that the belt 10D has an outside cover 31D about its entire periphery. The cover 31D may be applied using any suitable technique known in the art.

It will also be appreciated that the belts 10C and 10D may have elongated discrete particles or fibers embedded therein at any desired location in the belt and such particles may be similar to the particles 26A of the belt 10A.

Each belt 10, 10A, 10B, and 10D has an elastomeric layer 17, 17A, 17B, and 17D respectively disposed on its associated platform remote from its load-carrying cord. Each of these remote layers 17, 17A, 17B, and 17D is shown having a substantial thickness; however, it will be appreciated that as in the case of belt 10C a thin film may be provided inasmuch as the main purpose of such a remote layer or film is to assure adequate bonding with its adjoining tension or compression section.

Although detailed dimensions of components such as the load-carrying cord of the belt of this invention and the platform on either side thereof may vary depending upon the application of the particular belt and the detailed materials utilized, an example of exemplary dimensions of a typical belt 10 will now be presented; however, it will be appreciated that these dimensions would be typical for the other belt bodies or belts presented in this disclosure. In particular, the load-carrying cord 13 of belt 10 may be 0.55 inch in diameter and the thickness of each fabric base layer 15 may be generally of the order of 0.020 inch. With these dimensions the thickness of each layer 16 is controlled such that the distance between the cord 13 and the fabric base layer 15 is preferably kept at a minimum ranging generally between 0.005–0.010 inch to define what will be referred to as a gap 33, see FIG. 2. Accordingly, the thicknesses between the remote surfaces of base layers 15 will range between 0.105–0.115 inch whereby for a gap 33 which is 0.005 inch thick this represents 4.7 percent of 0.105 or the thickness between platforms 14 and for a gap 33 which is 0.010 inch thick this represents 8.7 percent of 0.115 or the thickness between platforms 14 with the thickness between platforms 14 being determined by the distance between the surfaces thereof remote from the load-carrying cord 13.

It has been found that the surface of each base layer which is near the load-carrying cord 13 cannot be too close thereto otherwise there will be a poor adhesive bond or elastomeric structure between the base layer and the load-carrying cord. However, it will be appreciated that in the case of a woven fabric base layer a few threads of such fabric base layer may contact the load-carrying cord without detriment. On the other hand, the gap 33 must not be too large otherwise the individual turns of the load-carrying cord will not be kept in the precise rectilinear alignment referred to heretofore. Accordingly, it has been determined that the thickness or dimension between the near surface of each base layer 15 and the load-carrying cord, i.e. the thickness of gap 33, may range between 4 and 10 percent of the thickness between platforms with such platforms being considered as defined by the surfaces of the fabric base layers disposed remote from cord 13.

It will also be appreciated that the base layer of each platform 14, 14A, 14B, 14C, and 14D may be made of any suitable material preferably in the form of woven fabric having warp threads or warps and weft threads or wefts. For example the warps may be disposed transverse the longitudinal dimension of the belt and be made of nylon. The wefts may be arranged parallel to the longitudinal dimension of the belt and be made of cotton. It will also be appreciated that the fabric base layer of each platform may be made of any suitable material. Further, fabric similar to so-called "tire cord fabric" may be used in which the warps which are disposed transverse or perpendicular the endless path of the belt are substantially greater in diameter than the wefts thereof to provide greater transverse rigidity for the associated belt. In addition, the fabric in each platform may be square woven as shown in an exaggerated manner in FIG. 1, so-called stress-relieved woven fabric, or non-woven fabric.

The various sections and component portions of the belt of this invention may be made of any suitable elastomeric material including both natural and synthetic rubber compounds, as well as any suitable synthetic plastic material.

Having described the belt bodies or belts 10 and 10A through 10D it will be appreciated that such belts may be employed to make a so-called banded belt 34 as shown in FIG. 3. The belt 34 comprises a plurality of laterally spaced belt bodies shown in this example as a plurality of three belt bodies or belts each designated by the same reference numeral 10B due to their similarity ot the belt body 10B of FIG. 5; and a tie band 35 is provided tying the belt bodies together in a high strength manner.

The tie band 35 of this example comprises a plurality of cooperating layers shown as an inner fabric layer 36, an outer fabric layer 37, an elastomeric matrix layer 38 disposed and bonded between layers 36 and 37 in sandwiched relation, and an elastomeric (rubber in this example) layer 40 which defines the outside or top surface of the belt 34. Each of the fabric layers of the tie band 35 may be made of a square woven fabric material, a stress-relieved fabric, a knitted fabric, or the like.

The laterally spaced belt bodies 10B of the banded belt 34 are self-contained and each is very similar to the belt body 10B of FIG. 5 except in FIG. 3 each belt body is minus the fabric cover 23B which comprises the belt body of FIG. 5. Also, each belt body 10B of FIG. 3 is provided without a fabric cover on the undulating surface of its teeth.

Accordingly, each belt body or belt 10B of the banded belt 34 has a tension section 11B, a compression section 12B, a helically wound load-carrying cord 13B, platforms 14B on each side of load-carrying cord 13B and a plurality of integral teeth 27B defined in its compression section 12B with the teeth extending transverse, i.e. perpendicular, the longitudinal axis of the belt body 10B and belt 34. It will also be appreciated that each belt body or belt 10B may have elongated discrete particles of fibers embedded in its tension section 11B, compression section 12B, or both of such sections, if desired. Further, a cover may be provided to define the undulating surface of teeth 27B.

The tie band 35 also has a layer 41 of elastomeric material which is compatible with the elastomeric material of each tension section 11B and defines the bottom portion (as viewed in FIG. 3) of the inner or bottom fabric layer 36 of the tie band 35. The layer 41 may be comparatively thick; however, in this example such layer is shown as a comparatively thin rubber layer which may be applied by any known process.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt body comprising, a tension section, a compression section, a continuous longitudinally extending load-carrying cord disposed between said sections and defined by a plurality of helically wound turns, and a platform on at least one side of said load-carrying cord, said platform having a fabric base layer and an elastomeric cord-engaging layer, said fabric base layer supporting said plurality of turns in precise rectilinear alignment at any cross section along said belt to provide substantially equal load distribution in said turns and thus promote longer belt body life, said cord being wound at a comparatively large helix angle.

2. A belt body as set forth in claim 1 in which said elastomeric cord-engaging layer is a layer of neoprene rubber.

3. A belt body as set forth in claim 1 in which said fabric base layer is a woven fabric.

4. A belt body as set forth in claim 1 in which said fabric base layer is a woven fabric having warps disposed substantially perpendicular to the longitudinal axis of said belt body and having wefts disposed substantially parallel to said axis.

5. A belt body as set forth in claim 1 in which each of said tension and compression sections is comprised of an elastomeric material and at least one of said sections has a plurality of elongated discrete fibers embedded therein.

6. A belt body as set forth in claim 1 and further comprising a cover on the top of said tension section defining the outside surface of said belt body and a cover on the bottom of said compression section defining the inside surface of said belt body.

7. A belt body as set forth in claim 1 of substantially trapezoidal cross-sectional configuration having non-parallel sides free of covers and wherein said comparatively large helix angle serves to reduce the amount of said cord exposed along said non-parallel sides.

8. A belt body as set forth in claim 1 in which said compression section has a plurality of integral teeth therein defining an undulating surface as the inside surface of said belt body.

9. A belt body as set forth in claim 1 having a cover completely therearound.

10. A belt body as set forth in claim 1 having opposed sides free of covers and wherein said comparatively large helix angle also serves to reduce the amount of said cord exposed along said sides.

11. An endless power transmission belt body comprising a tension section, a compression section, a continuous longitudinally extending load-carrying cord disposed between said sections and defined by a plurality of helically wound turns, and a platform on each side of each load-carrying cord, each platform having a fabric base layer and an elastomeric cord-engaging layer, each fabric base layer supporting said plurality of turns in precise rectilinear alignment at any cross section along said belt body to provide substantially equal load distribution in said turns and thus promote longer belt body life, said cord being disposed with its turns at a comparatively large helix angle.

12. A belt body as set forth in claim 11 in which each of said elastomeric cord-engaging layers has a thickness which is a fractional part of the thickness of said cord.

13. A belt body as set forth in claim 11 in which each of said base layers of each platform has a gap between its near surface and said load-carrying cord, each gap having a thickness ranging between 4 and 10 percent of the thickness between said platforms.

14. A belt body as set forth in claim 11 in which each of said platforms has an elastomeric layer disposed on the surface of its fabric layer remote from said load-carrying cord with each elastomeric layer remote from said load-carrying cord being smaller in thickness than its cord-engaging layer.

15. A belt body as set forth in claim 14 in which each of said layers of each platform is a layer of neoprene rubber.

16. A belt body as set forth in claim 14 and further comprising a cover on the top surface of said tension section defining the outside surface of said belt body and a cover on the bottom surface of said compression section defining the inside surface of said belt body.

17. A belt body as set forth in claim 11 in which said fabric base layer of each platform is a woven fabric having warps disposed substantially perpendicular to the longitudinal axis of said belt body and having wefts disposed substantially parallel to said axis.

18. A belt body as set forth in claim 17 in which each of said tension and compression sections is comprised of an elastomeric material and at least one of said sections has a plurality of elongated discrete fibers embedded therein.

19. A belt body as set forth in claim 17 in which said compression section has a plurality of integral teeth therein defining an undulating surface as the inside surface of said belt body, each of said teeth extending perpendicular to said longitudinal axis across the full width of said belt body.

20. A belt body as set forth in claim 17 having a cover completely therearound.

21. An endless power transmission belt for operation in an endless path comprising a plurality of laterally spaced belt bodies and a tie band interconnecting said belt bodies with each of said belt bodies comprising, a tension section, a compression section, a continuous longitudinally extending load-carrying cord disposed between said sections and defined by a plurality of helically wound turns, and a platform on each side of each load-carrying cord, each platform having a fabric base layer and an elastomeric cord-engaging layer, each fabric base layer supporting said plurality of turns in precise rectilinear alignment at any cross section along each belt body to provide substantially equal load distribution in said turns and thus promote longer belt life, each of said cords being disposed with its turns at a comparatively large helix angle.

22. A belt as set forth in claim 21 in which each of said base layers of each platform of each belt body has a gap between its near surface and its load-carrying cord, each gap having a thickness ranging between 4 and 10 percent of the thickness between said platforms.

23. A belt as set forth in claim 22 in which said entire belt is made primarily of elastomeric material and said tie band is comprised of at least one fabric layer.

* * * * *